United States Patent
Neubert et al.

[11] Patent Number: 5,387,970
[45] Date of Patent: Feb. 7, 1995

[54] NULLIFYING LENS AND TEST METHOD FOR QUALITY CONTROL OF INTRAOCULAR LENSES

[75] Inventors: William J. Neubert, Ballwin, Mo.; David L. Mustain, Largo, Fla.

[73] Assignee: American Cyanamid Co., Wayne, N.J.

[21] Appl. No.: 163,972

[22] Filed: Dec. 7, 1993

[51] Int. Cl.⁶ .............................................. G01B 9/00
[52] U.S. Cl. .................................................... 356/124
[58] Field of Search ................ 356/124, 125, 126, 127

[56] References Cited

U.S. PATENT DOCUMENTS

| 4,213,701 | 7/1980 | Lanzilloti | 356/124 |
| 4,508,216 | 4/1985 | Kelman | 359/808 |
| 4,639,133 | 1/1987 | Cole | 356/125 |

OTHER PUBLICATIONS

"Optical Shop Testing," 2d Edition, Chapter 5, John Wiley & Sons, Inc., 1992.

*Primary Examiner*—F. L. Evans
*Attorney, Agent, or Firm*—B. R. Woodworth

[57] ABSTRACT

A method for testing multifocal intraocular lenses and intraocular lenses having designed-in optical aberrations. The method includes the providing of a nullifying lens having an optical zone configured such that light passing through the optical zone and through the intraocular lens is focused at a single plane if the intraocular lens does not contain any fabrication flaws. The invention further includes a nullifying lens constructed such that light passing through the nullifying lens and through an intraocular lens is focused at a single plane if the intraocular lens does not contain any fabrication flaws.

12 Claims, 1 Drawing Sheet

NULLIFYING LENS AND TEST METHOD FOR QUALITY CONTROL OF INTRAOCULAR LENSES

BACKGROUND OF THE INVENTION

The present invention relates to a method for testing intraocular lenses for the purpose of determining the quality thereof. In particular, the method of the present invention is directed to the use of a nullifying lens in the testing of multifocal intraocular lenses and in the testing of intraocular lenses having designed-in optical aberrations. The invention is further directed to a nullifying lens configured such that light passing through an intraocular lens and through the nullifying lens is focused at a single plane, thereby facilitating an analysis of the optical characteristics of the intraocular lens.

U.S. Pat. No. 4,213,701 to Lanzilloti discloses a method and apparatus for testing intraocular lenses. In particular, Lanzilloti discloses an apparatus constructed for use in determining the dioptric power, resolving power, and astigmatic power of an intraocular lens. U.S. Pat. No. 4,639,133 to Cole also discloses a method for determining the dioptric power of an intraocular lens. However, neither Lanzilloti nor Cole addresses the issue of quality testing of multifocal intraocular lenses and intraocular lenses having designed-in optical aberrations.

The U.S. Food and Drug Administration (FDA) requires that all multifocal intraocular lenses be subjected to a series of qualitative and quantitative analyses for the purpose of determining whether each lens meets the requisite optical standards. These qualitative analyses include a determination of the lens' resolution, resolution efficiency, and modulation transfer function (MTF).

Due to the presence of multiple optical zones or designed-in aberrations in certain intraocular lenses, it can be difficult to fulfill the above-referenced FDA testing requirements. For example, multifocal intraocular lenses include a plurality of zones having different optical characteristics, including different focal lengths. Thus, light directed through these multifocal intraocular lenses will have a plurality of focal points. Although it is possible to conduct separate analyses of the multifocal intraocular lens at each of these focal points, such a testing procedure is time-consuming and does not provide sensitive results. The lack of sensitivity associated with such testing procedures is caused by the fact that light focused by one optical zone of the multifocal lens will tend to be blurred by light refracted by other zones of the lens which are not designed to focus an image at the same plane, thereby making an accurate analysis difficult or impossible. As a result, the detection of fabrication defects in multifocal intraocular lenses using standard testing techniques is not particularly practical using known testing procedures. The same problem also exists with respect to intraocular lenses having designed-in optical aberrations.

SUMMARY OF THE INVENTION

The method of testing of the present invention includes placing an intraocular lens and a nullifying lens in a light path. The nullifying lens used in conjunction with the method of the present invention is specifically constructed for use with the intraocular lens being tested such that the intraocular lens and the nullifying lens will focus light passing therethrough at a single plane in the event that there are no fabrication defects in the intraocular lens. However, if the intraocular lens contains flaws, the intraocular lens and the nullifying lens will create aberrations or irregularities rather than forming a sharp, focused image lying in a single plane, thereby indicating the presence of the fabrication defect. The device of the present invention is a nullifying lens constructed for use in conjunction with the method of the present invention. The optical characteristics of the nullifying lens are determined by the optical characteristics of the intraocular lens undergoing testing. In particular, the nullifying lens is constructed such that light passing through it and through the intraocular lens will be focused at a single plane, in the event that there are no fabrication defects in the intraocular lens thereby facilitating qualitative and quantitative testing of the intraocular lens.

BRIEF DESCRIPTION OF THE DRAWINGS

For a more complete understanding of the present invention, reference may be had to the following Detailed Description read in connection with the accompanying drawings in which.

DETAILED DESCRIPTION

Figure 1:
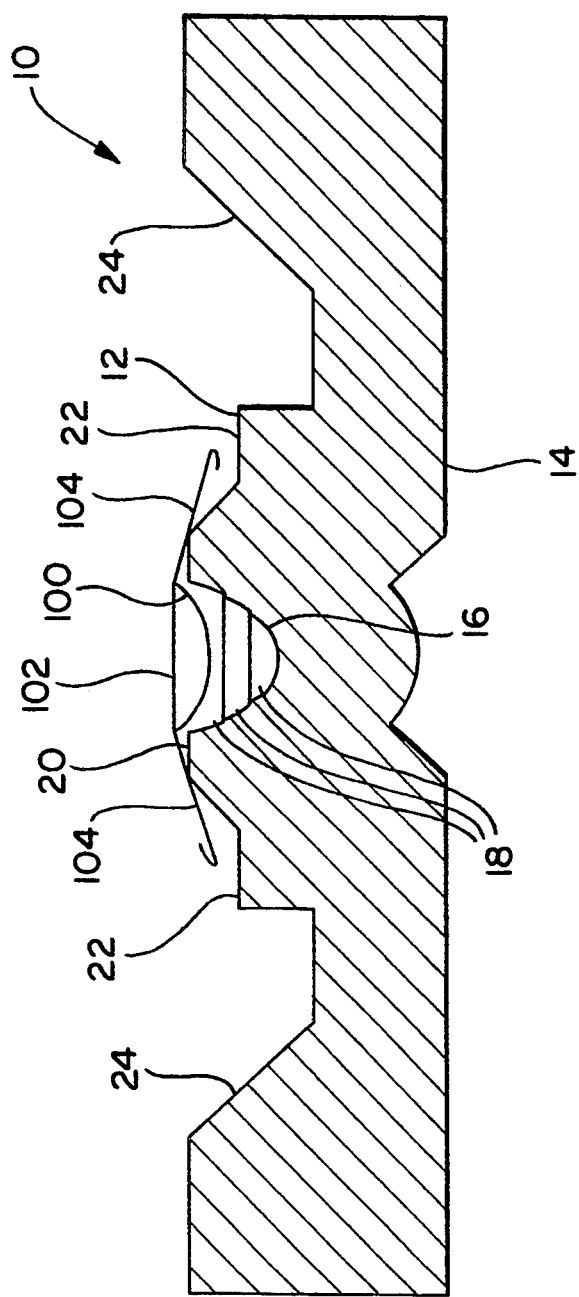
FIG. 1 is a cross-sectional view of a nullifying lens constructed in accordance with the present invention in place with a multifocal intraocular lens undergoing testing in accordance with the method of the present invention.

A nullifying lens constructed in accordance with the present invention is generally indicated at 10 of FIG. 1. Although nullifying lens 10 is described herein as having a circular shape, it will be appreciated that nullifying lens 10 can have a variety of shapes without departing from the spirit and scope of the present invention. Nullifying lens 10 includes anterior surface 12 and posterior surface 14. Optical zone 16 is formed on nullifying lens 10. Optical zone 16 is configured such that its optical characteristics nullify the optical effects of a particular model of intraocular lens 100, thereby focusing light passing through intraocular lens 100 and nullifying lens 10 at a single plane. In the embodiment of the present invention depicted in FIG. 1, optical zone 16 includes three coaxial optical areas 18. However, various configurations of optical zone 16 are required in conjunction with the present invention, as described in greater detail below.

The optical characteristics of nullifying lens 10 will vary dependent upon the optical characteristics of intraocular lens 100 with which nullifying lens 10 is to be used. Due to existence of a nearly infinite number of configurations of multifocal intraocular lenses and intraocular lenses having designed-in aberrations, it is not possible to discuss herein each possible configuration of nullifying lens 10. However, a person of ordinary skill in the pertinent art will have the ability to construct nullifying lenses in accordance with the present invention by analyzing the desired optical characteristics of the intraocular lens model to be tested and by creating a nullifying lens having a capacity to nullify the optical characteristics of the intraocular lens model such that light passing through the nullifying lens and the intraocular lens will be focused at a single plane when the intraocular lens does not contain any fabrication flaws. By creating a focused image at a single plane, nullifying lenses constructed in accordance with the present invention permit multifocal intraocular lenses, and intraocular lenses having designed-in aberrations, to be tested in the same manner that single vision intraocular lenses are tested.

Nullifying lens 10 further includes an annular flat zone 20 capable of supporting intraocular lens 100 as it undergoes testing in accordance with the device and method of the present invention. When intraocular lens 100 is placed against nullifying lens 10, lens optic 102 overlies optical zone 16 of nullifying lens 10. Annular recessed area 22 is formed on anterior surface 12 of nullifying lens 10 in order to accommodate the haptics 104 of intraocular lens 100 as it undergoes testing. Outer area 24 of nullifying lens 10 is provided in order to permit nullifying lens 10 to be clamped to an appropriate testing apparatus.

The method of the present invention is directed to the use of nullifying lens 10 in conjunction with the optical testing of intraocular lens 100. The method can be used with multifocal intraocular lenses as well as intraocular lenses having designed-in optical aberrations. As above-discussed, it is necessary to provide a nullifying lens 10 constructed for use with the particular model of intraocular lens 100 undergoing testing. The optical configuration of nullifying lens 10 and optical zone 16 will vary dependent upon the number, orientation, and power of the various optical zones of multifocal intraocular lens 100 and dependent upon the presence of any designed-in optical aberrations in the lens. Nevertheless, the configuration of optical zone 16 of nullifying lens 10 is designed such that light passing through nullifying lens 10 and intraocular lens 100 undergoing testing is focused at a single plane when intraocular lens 100 does not contain any fabrication flaws.

When the appropriate nullifying lens has been selected, the intraocular lens undergoing testing is placed in the same light path as the nullifying lens for the purpose of analysis. Intraocular lens 100 can be placed against anterior surface 12 of intraocular lens 100 as shown in FIG. 1. However, it will be appreciated that it is not necessary to place intraocular lens 100 in direct physical contact with nullifying lens 10. Intraocular lens 100 can be positioned at a location spaced from either the anterior or posterior side of nullifying lens 10 without departing from the spirit and scope of the present invention. However, the optical characteristics of optical zone 16 of nullifying lens 10 will have to be varied dependent upon the relative orientations of nullifying lens 10 and intraocular lens 10 during the testing procedure.

The method of the present invention further includes the directing of light through multifocal intraocular lens 100 and nullifying lens 10. When multifocal intraocular lens 100 and nullifying lens 10 are properly fabricated, light directed through all optical zones of multifocal intraocular lens 100 and nullifying lens 10 will be focused at a single plane spaced therefrom. In the event that multifocal intraocular lens 100 contains fabrication flaws, light passing through such flawed areas will be focused at a different plane, thereby indicating to a person observing the results of the test that the intraocular lens contains a fabrication flaw.

Further qualitative or quantitative testing of intraocular lens 100 can be conducted using known techniques after it has been ascertained that intraocular lens 100 does not contain any fabrication flaws. These additional tests can be conducted as if the intraocular lens undergoing testing were a single vision intraocular lens due to the optical effect of nullifying lens 10.

Although the present invention has been described herein with respect to certain preferred embodiments, it will be apparent to one of ordinary skill in the art that various modifications can be made without departing from the spirit and scope of the invention disclosed and claimed herein.

What is claimed is:

1. A method for analyzing an intraocular lens having a plurality of optical zones, said method comprising the steps of:

providing a nullifying lens, said nullifying lens having a plurality of nullifying optical zones, said plurality of nullifying optical zones being arranged on said nullifying lens and constructed whereby light passing through one or more of said plurality of optical zones of said intraocular lens and through said nullifying lens is focused at a single plane when said intraocular lens does not contain a fabrication flaw;

placing said intraocular lens and said nullifying lens in a light path;

passing light through said intraocular lens and through said nullifying lens along said light path; and observing whether light passing through said intraocular lens and through said nullifying lens is focused at a single plane, whereby fabrication flaws in said intraocular lens are identified if light passing through said intraocular lens and through said nullifying lens is not focused at a single plane.

2. A method for analyzing an intraocular lens having a plurality of optical zones in accordance with claim 1, wherein said nullifying lens has an anterior surface and wherein said intraocular lens is placed in physical contact with said anterior surface of said nullifying lens in said light path.

3. A method for analyzing an intraocular lens having a plurality of optical zones in accordance with claim 1, wherein said nullifying lens and said intraocular lens are spaced from one another when said nullifying lens and said intraocular lens are placed in said light path.

4. A nullifying lens constructed for use in testing an intraocular lens having a plurality of optical zones, said nullifying lens comprising:

a plurality of nullifying optical zones, said plurality of nullifying optical zones being arranged on said nullifying lens and constructed such that light passing through one or more of said plurality of optical zones of said intraocular lens and through said nullifying lens is focused at a single plane spaced from said nullifying lens when said intraocular lens does not contain a fabrication flaw.

5. A nullifying lens constructed for use in testing an intraocular lens having a plurality of optical zones in accordance with claim 4, wherein said nullifying lens further comprises an anterior surface, said anterior surface of said nullifying lens defining a recessed area therein, said recessed area being disposed about said plurality of nullifying optical zones, said recessed area being configured to receive haptics mounted on said intraocular lens.

6. A nullifying lens constructed for use in testing an intraocular lens having a plurality of optical zones in accordance with claim 4, wherein said nullifying lens further comprises an outer support area disposed about said plurality of nullifying optical zones, said outer support area constructed to permit said nullifying lens to be mounted on a testing apparatus.

7. A nullifying lens constructed for use in testing an intraocular lens having designed-in optical aberrations, said nullifying lens comprising:

a nullifying optical zone, said nullifying optical zone being configured such that light passing through said nullifying optical zone and through said intraocular lens having designed-in optical aberrations is focused at a single plane spaced from said nullifying lens when said intraocular lens having designed-in optical aberrations does not contain a fabrication flaw.

8. A nullifying lens constructed for use in testing an intraocular lens having designed-in optical aberrations in accordance with claim 7, wherein said nullifying lens further comprises a first surface, said first surface of said nullifying lens defining a recessed area therein, said recessed area being disposed about said nullifying optical zone, said recessed area being configured to receive haptics mounted on said intraocular lens having designed-in optical aberrations.

9. A nullifying lens constructed for use in testing an intraocular lens having designed-in optical aberrations in accordance with claim 7, wherein said nullifying lens further comprises an outer support area disposed about said nullifying optical zone, said outer support area constructed to permit said nullifying lens to be mounted on a testing apparatus.

10. A method for analyzing an intraocular lens having designed-in optical aberrations, said method comprising the steps of:

providing a nullifying lens having a nullifying optical zone configured such that light passing through said intraocular lens and through said nullifying lens is focused at a single plane when said intraocular lens does not contain a fabrication flaw;

placing said intraocular lens and said nullifying lens in a light path;

passing light through said intraocular lens and through said nullifying lens along said light path; and observing whether light passing through said intraocular lens and through said nullifying lens is focused at a single plane, whereby fabrication flaws in said intraocular lens are identified if light passing through said intraocular lens and through said nullifying lens is not focused at a single plane.

11. A method for analyzing an intraocular lens having designed-in optical aberrations in accordance with claim 10, wherein said nullifying lens has an anterior surface and wherein said intraocular lens is placed in physical contact with said anterior surface of said nullifying lens in said light path.

12. A method for analyzing an intraocular lens having designed-in optical aberrations in accordance with claim 10, wherein said nullifying lens and said intraocular lens are spaced from one another when said nullifying lens and said intraocular lens are placed in said light path.

* * * * *